United States Patent
Miyamoto

(10) Patent No.: US 6,631,467 B1
(45) Date of Patent: Oct. 7, 2003

(54) MICROCOMPUTER TIMING CONTROL CIRCUIT PROVIDED WITH INTERNAL RESET SIGNAL GENERATOR TRIGGERED BY EXTERNAL RESET SIGNAL

(75) Inventor: Taiyuu Miyamoto, Hyogo (JP)

(73) Assignees: Mitsubishi Denki Kabushiki Kaisha, Tokyo (JP); Mitsubishi Electric System LSI Design Corporation, Itami (JP)

( * ) Notice: Subject to any disclaimer, the term of this patent is extended or adjusted under 35 U.S.C. 154(b) by 576 days.

(21) Appl. No.: 09/634,950

(22) Filed: Aug. 7, 2000

(30) Foreign Application Priority Data

Feb. 18, 2000 (JP) ........................................ 2000-041003

(51) Int. Cl.[7] .................. G06F 15/177; H03K 19/00; H03L 7/00
(52) U.S. Cl. .............. 713/1; 327/143; 327/12; 326/16
(58) Field of Search ............... 713/1; 326/16; 327/12, 142, 143

(56) References Cited

U.S. PATENT DOCUMENTS

| | | | |
|---|---|---|---|
| 4,716,521 A | | 12/1987 | Nagae |
| 5,157,270 A | * | 10/1992 | Sakai ........................... 307/66 |
| 5,576,650 A | * | 11/1996 | Hirotani et al. ............. 327/142 |
| 5,767,694 A | * | 6/1998 | Ogata ........................... 326/16 |
| 5,774,649 A | * | 6/1998 | Goh ............................. 714/55 |
| 5,936,443 A | * | 8/1999 | Yasuda et al. ............... 327/143 |
| 6,417,704 B1 | * | 7/2002 | Nakajima et al. ........... 327/143 |

FOREIGN PATENT DOCUMENTS

| | | | |
|---|---|---|---|
| EP | 0689290 A1 | * | 6/1995 |
| JP | 355053761 A | * | 4/1980 |
| JP | 358178430 A | * | 10/1983 |
| JP | 60-19220 | | 1/1985 |
| JP | 362003574 A | * | 1/1987 |
| JP | 402096246 A | * | 4/1990 |

OTHER PUBLICATIONS

Vigyan Singhal et al., "The Case for Retiming with Explicit Reset Circuitry", IEEE 1996, pp 618–625.*

* cited by examiner

*Primary Examiner*—Thomas Lee
*Assistant Examiner*—Chun Cao
(74) *Attorney, Agent, or Firm*—Burns, Doane, Swecker & Mathis, LLP

(57) ABSTRACT

A microcomputer has an internal reset signal generator for generating an internal reset signal from an external reset signal supplied via a chip reset input terminal. The internal reset signal generator includes a first two-input logic circuit that has its first gate input terminal connected to the chip reset input terminal and outputs a low-level first logic signal only when its two gate input terminals are placed at a high level. The first logic signal is inverted by an inverter and is supplied to the second gate input terminal of the first two-input logic circuit. The second gate input terminal is pulled up by a capacitor connected to a higher power supply voltage terminal. The external reset signal and the first logic signal are supplied to a second two-input logic circuit that changes the level of the reset signal only when both the inputs are at the high level. The internal reset signal generator can disable the high level of the external reset signal at the power-up, and hence can solve a problem of a conventional microcomputer in that when the external reset signal is placed at a high level at or on the power-up, the central processing unit of the microcomputer can run away.

6 Claims, 6 Drawing Sheets

US 6,631,467 B1

MICROCOMPUTER TIMING CONTROL CIRCUIT PROVIDED WITH INTERNAL RESET SIGNAL GENERATOR TRIGGERED BY EXTERNAL RESET SIGNAL

BACKGROUND OF THE INVENTION

1. Field of the Invention

The present invention relates to a microcomputer with an internal reset signal generator preferably applied to a superhighway automatic toll system, and particularly to an improved microcomputer that can effectively prevent runaway of internal circuits of the microcomputer due to variations in the timing of an external reset signal at power-up.

2. Description of Related Art

FIG. 5 is a block diagram showing a configuration of a conventional microcomputer. In FIG. 5, the reference numeral 25 designates a microcomputer; 26 designates a chip ground input terminal; 27 designates a chip higher potential power supply input terminal; 28 designates a chip reset input terminal; reference numerals 29 designate a pair of chip serial input/output terminals; 30 designate a pair of chip oscillator connection input/output terminals; and reference numeral 31 designates a chip port input/output terminal.

The reference numeral 32 designates an oscillator; 33 designates a clock generator; 34 designates a central processing unit; 35 designates a data bus; 36 designates a RAM (Random Access Memory); 37 designates a ROM (Read Only Memory); 38 designates a timer; 39 designates a serial communication circuit; and 40 designates a port circuit, all of which are internal circuits constituting the microcomputer.

Next, the operation of the conventional microcomputer will be described.

As shown in FIG. 6, a high-level external reset signal is supplied to the chip reset input terminal 28 after a predetermined time has elapsed from power on, which will reset the internal circuits 34–39 like the central processing unit. Subsequently, the reset of the internal circuits 34–39 like the central processing unit is released so that the central processing unit 34 achieves desired functions in accordance with programs stored in the ROM 37.

With the foregoing configuration, the conventional microcomputer has a problem in that the internal circuits 34–39 can run away if the external reset signal is at the high level at the power-up as shown in FIG. 7, or if the external reset signal is driven to the high level on the power-up as shown in FIG. 8. This is because the central processing unit 34 can start in such cases to execute a program from an address other than the address of a reset vector.

SUMMARY OF THE INVENTION

The present invention is implemented to solve the foregoing problem. It is therefore an object of the present invention to provide a microcomputer with an internal reset signal generator for effectively preventing runaway of internal circuits due to variations in the timing of the external reset signal at the power-up.

According to a first aspect of the present invention, there is provided a microcomputer with an internal reset signal generator for generating an internal reset signal from an external reset signal supplied to a chip reset input terminal and for supplying the internal reset signal to internal circuits of the microcomputer through a reset signal line, the internal reset signal generator comprising: a first two-input logic circuit having its first gate input terminal connected to the chip reset input terminal, for outputting a first logic signal at a low level only when its two gate input terminals are placed at a high level; an inverter for inverting the first logic signal and supplying its output to a second gate input terminal of the first two-input logic circuit; a capacitor connected between the second gate input terminal and a higher potential power supply terminal; and a second two-input logic circuit supplied with the first logic signal and the external reset signal, for changing the level of the internal reset signal only when both the inputs are at the high level.

Here, the internal reset signal generator may further comprise an inverter connected to an output of the second two-input logic circuit.

The first two-input logic circuit and the second two-input logic circuit may each consist of a two-input NAND circuit.

According to a second aspect of the present invention, there is provided an internal reset signal generator which generates an internal reset signal from an external reset signal supplied to a chip reset input terminal, the internal reset signal generator comprising: a first two-input logic circuit having its first gate input terminal connected to the chip reset input terminal, for outputting a first logic signal at a low level only when its two gate input terminals are placed at a high level; an inverter for inverting the first logic signal and supplying its output to a second gate input terminal of the first two-input logic circuit; a capacitor connected between the second gate input terminal and a higher potential power supply terminal; and a second two-input logic circuit supplied with the first logic signal and the external reset signal, for changing the level of the internal reset signal only when both the inputs are at the high level.

Here, the internal reset signal generator may further comprise an inverter connected to an output of the second two-input logic circuit.

The first two-input logic circuit and the second two-input logic circuit may each consist of a two-input NAND circuit.

DETAILED DESCRIPTION OF THE PREFERRED EMBODIMENTS

The invention will now be described with reference to the accompanying drawings.

EMBODIMENT 1

Figure 1:
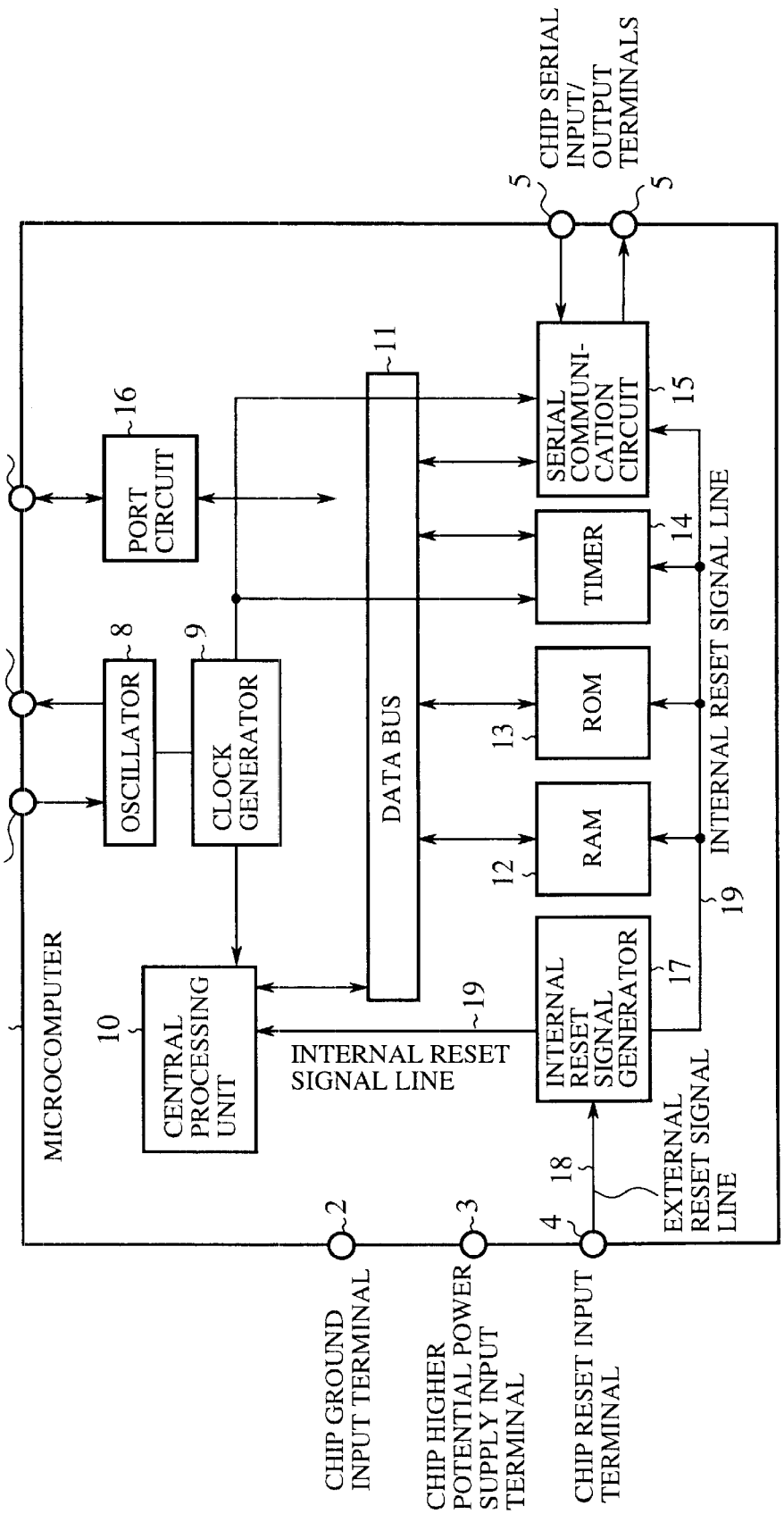
FIG. 1 is a block diagram showing a configuration of an embodiment 1 of a microcomputer in accordance with the present invention.

FIG. 1 is a block diagram showing a configuration of an embodiment 1 of a microcomputer in accordance with the present invention. The microcomputer is applicable to a superhighway automatic toll system, for example. In FIG. 1, the reference numeral 1 designates a microcomputer; 2 designates a chip ground input terminal; 3 designates a chip higher potential power supply input terminal; 4 designates a chip reset input terminal; reference numerals 5 designate a pair of chip serial input/output terminals; 6 designate a pair of chip oscillator connection input/output terminals; and reference numeral 7 designates a chip port input/output terminal.

The reference numeral 8 designates an oscillator connected to the chip oscillator connection input/output terminals 6 and 6; 9 designates a clock generator for generating an internal clock signal from the oscillation signal of the oscillator 8; 10 designates a central processing unit operating on the basis of the internal clock signal; 11 designates a data bus used for transferring data to and from the central processing unit 10; 12 designates a RAM (Random Access Memory) connected to the data bus 11; 13 designates a ROM (Read Only Memory) connected to the data bus 11 for storing programs to be executed by the central processing unit 10; 14 designates a timer connected to the data bus 11; 15 designates a serial communication circuit connected to the data bus 11 for carrying out an input/output processing of the data to and from the chip serial input/output terminals 5 and 5; 16 designates a port circuit connected to the data bus 11 for carrying out an input/output processing of the data to and from the chip port input/output terminal 7; 17 designates an internal reset signal generator for generating an internal reset signal from the external reset signal supplied via the chip reset input terminal 4, and for supplying the internal reset signal to the internal circuits 10–16; 18 designates an external reset signal line for the external reset signal; and 19 designates an internal reset signal line for the internal reset signal. The internal circuits 10–16 and the internal reset signal generator 17 operate using as their supply voltage a voltage applied across the chip higher potential power supply input terminal 3 and the chip ground input terminal 2.

Figure 2:
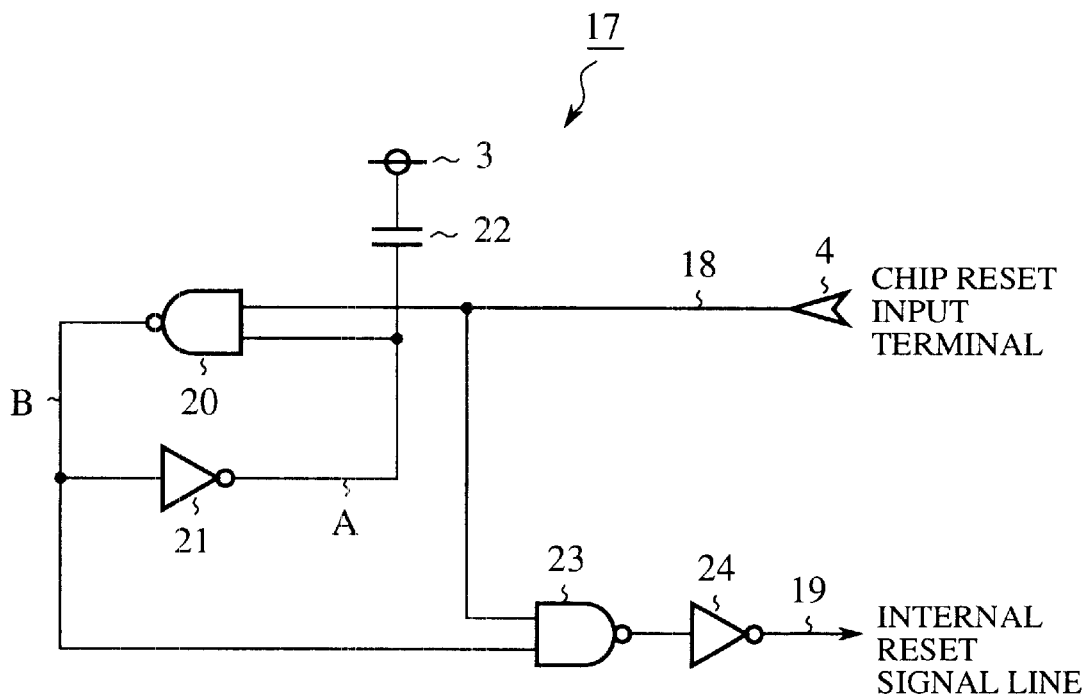
FIG. 2 is a circuit diagram showing a configuration of an internal reset signal generator of the embodiment 1 in accordance with the present invention.

FIG. 2 is a circuit diagram showing a configuration of an internal reset signal generator of the present embodiment 1 in accordance with the present invention. In FIG. 2, the reference numeral 20 designates a first two-input NAND circuit that has its first gate input terminal connected with the external reset signal line 18, and outputs a low-level first logic signal only when its two gate input terminals are supplied with high-level signals simultaneously; 21 designates a first inverter that inverts the first logic signal, and feeds it back to the second gate input terminal of the first two-input NAND circuit 20; 22 designates a capacitor connected across the second gate input terminal and the chip higher potential power supply input terminal 3; 23 designates a second two-input NAND circuit that is supplied with the first logic signal and the external reset signal, and outputs a low-level second logic signal only when both the two inputs are at the high level; and 24 designates a second inverter for inverting the output of the second two-input NAND circuit 23, and supplies it to the internal reset signal line 19 as an internal reset signal.

Next, the operation of the present embodiment 1 will be described.

When the power is turned on in the case where the external reset signal is at the low level, the first two-input NAND circuit 20 outputs the high-level first logic signal regardless of the voltage level at its second gate input terminal pulled up to the chip higher potential power supply input terminal 3 through the capacitor 22. Then, in response to the high-level first logic signal, the first inverter 21 outputs a low level signal, which drives the second gate input terminal to the low level. Thus, the second two-input NAND circuit 23 has its first input terminal supplied with the low-level external reset signal and its second gate input terminal supplied with the high-level first logic signal, in which case the second inverter 24 drives the internal reset signal to the low level.

When the external reset signal is driven to the high level in this state, the two gate input terminals of the second two-input NAND circuit 23 are both placed at the high level. This will change its output to the low level, and the output of the second inverter 24 to the high level, thereby driving the internal reset signal to the high level, which will reset the internal circuits 10–16 like the central processing unit.

Figure 3:
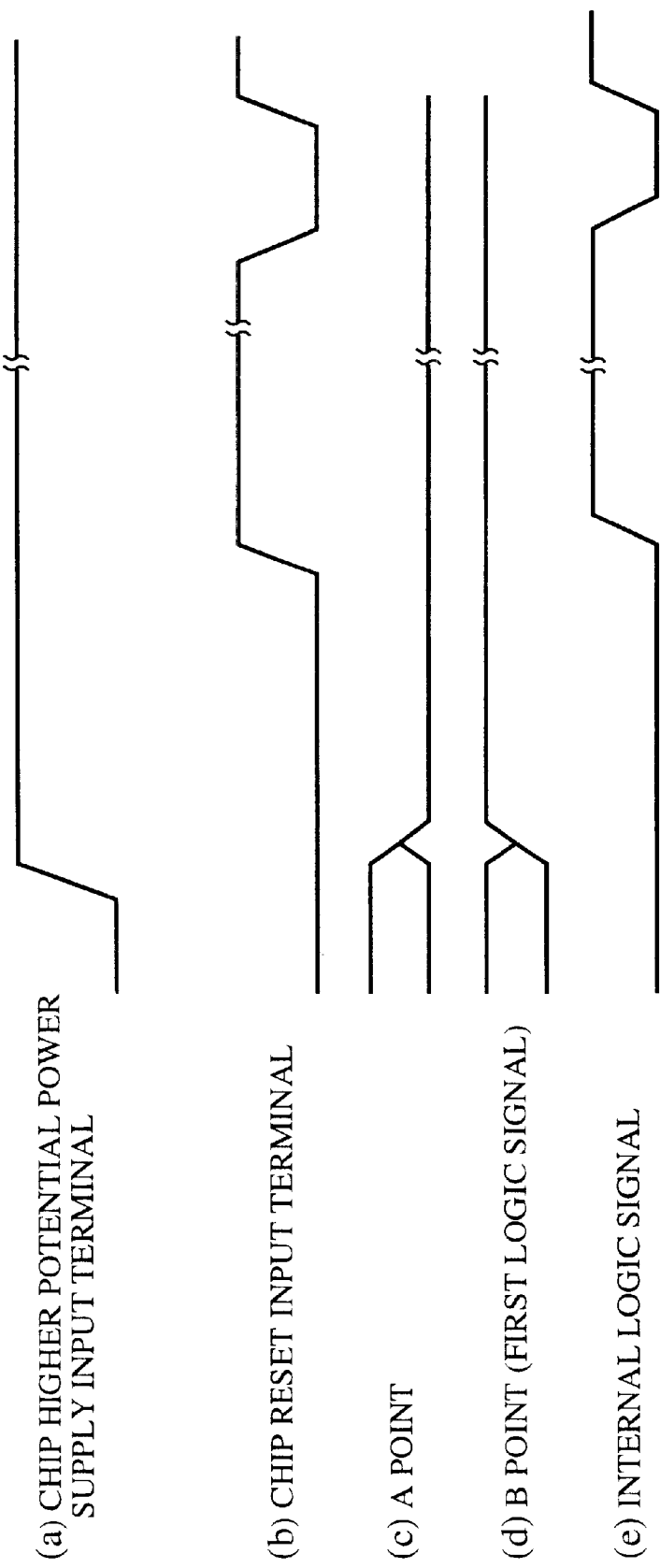
FIG. 3 is a timing chart illustrating a reset operation of the embodiment 1 in accordance with the present invention when the external reset signal is at a low level at the power-up.

FIG. 3 shows the foregoing operation, in which FIG. 3(a) illustrates the higher potential power supply voltage level fed to the chip higher potential power supply input terminal 3; FIG. 3(b) illustrates the level of the external reset signal; FIG. 3(c) illustrates the signal level at a point A in FIG. 2 (second gate input terminal of the first two-input NAND circuit 20); FIG. 3(d) illustrates the signal level at a point B in FIG. 2 (first logic signal); and FIG. 3(e) illustrates the level of the internal reset signal. As clearly seen from FIG. 3, the internal reset signal is driven to the high level by driving the external reset signal to the high level.

At the time when the external reset signal is driven to the high level, the first logic signal continues the high level state because the second gate input terminal of the first two-input NAND circuit 20 is fixed at the low level by the first inverter 21. Accordingly, a subsequent transition of the external reset signal to the low level will drive the internal reset signal to the low level, and the transition to the high level will drive it to the high level.

Next, in the case where the external reset signal is at the high level when the prescribed voltage is supplied to the chip higher potential power supply input terminal 3 on the power-up, the first two-input NAND circuit 20 outputs the low-level first logic signal because the second gate input terminal is pulled up through the capacitor 22. Thus, the second two-input NAND circuit 23 has its first input terminal supplied with the high-level external reset signal and its second gate input terminal supplied with the low-level first logic signal, in which case the second inverter 24 drives the internal reset signal to the low level.

When the external reset signal is driven to the low level in this state, the output of the first two-input NAND circuit 20 changes to the high level, which in turn changes the output of the first inverter 21 to the low level. Thus, the second two-input NAND circuit 23 has its first input supplied with the low-level external reset signal, and its second input terminal supplied with the high-level first logic signal. Since the subsequent operation is the same as that when the prescribed voltage is applied to the chip higher potential power supply input terminal 3 while the external reset signal is at the low-level state, the description thereof is omitted here.

Figure 4:
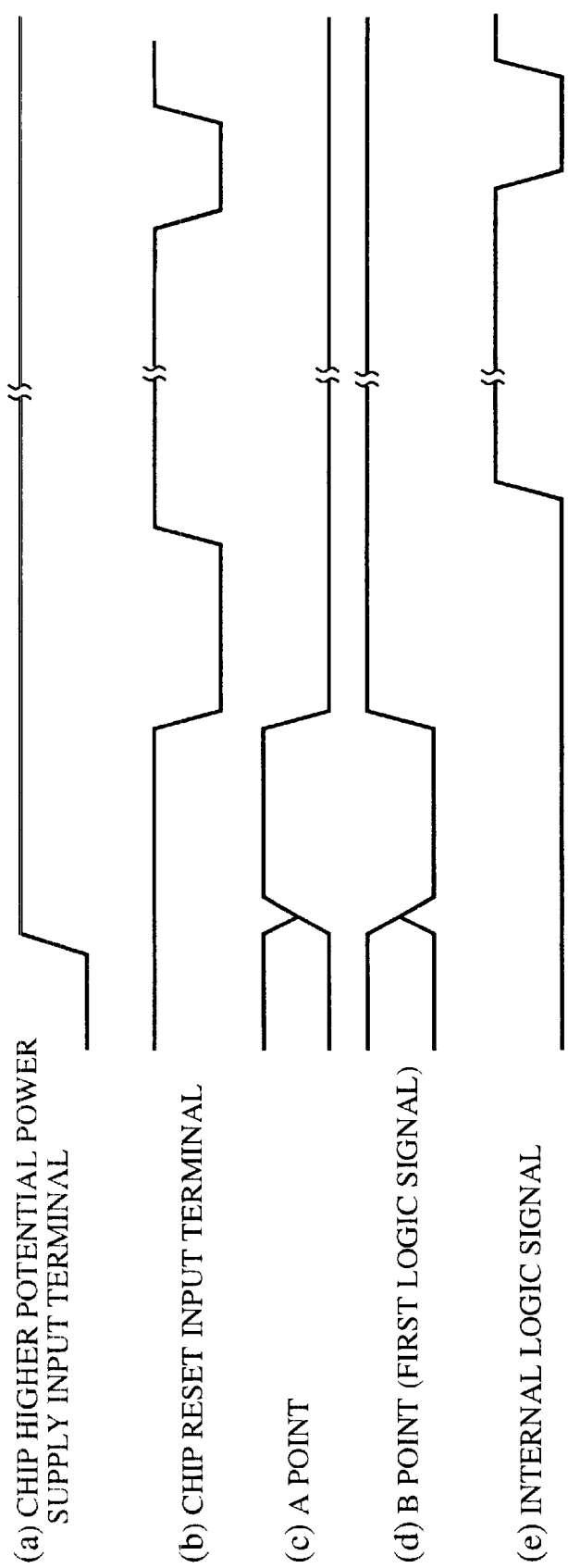
FIG. 4 is a timing chart illustrating a reset operation of the embodiment 1 in accordance with the present invention when the external reset signal is at a high level at the power-up.
Figure 5:
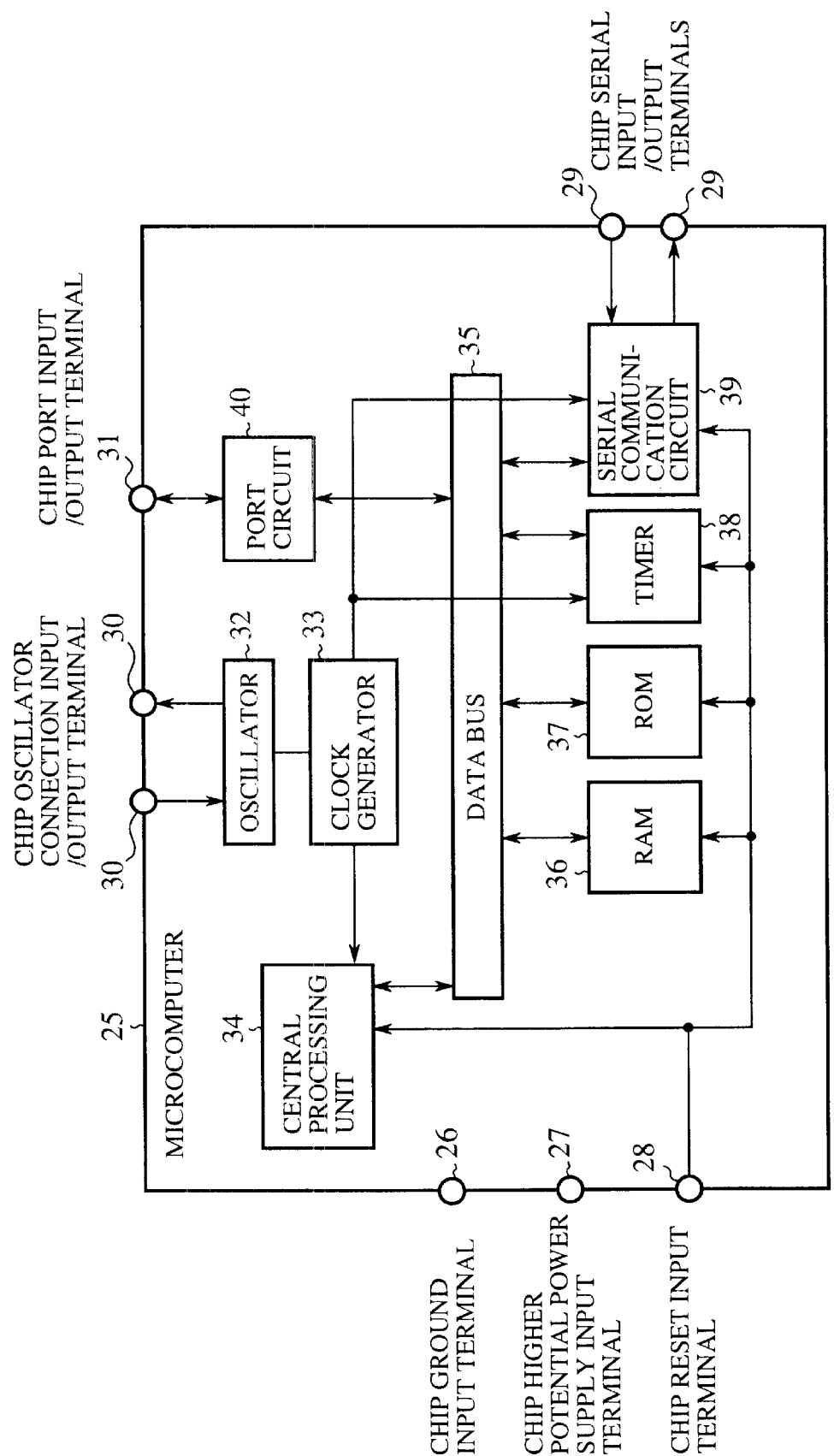
FIG. 5 is a block diagram showing a configuration of a conventional microcomputer.
Figure 6:
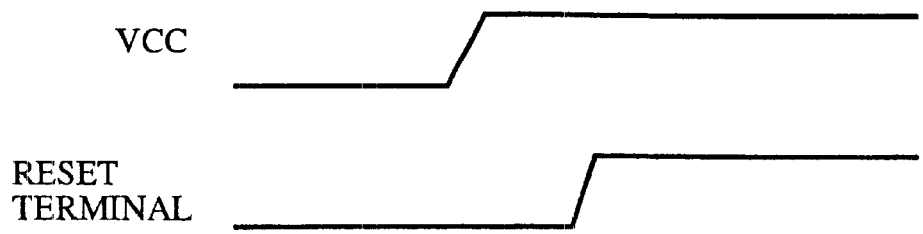
FIG. 6 is a timing chart illustrating a reset operation of the conventional microcomputer when the external reset signal is at the low level at the power-up.
Figure 7:
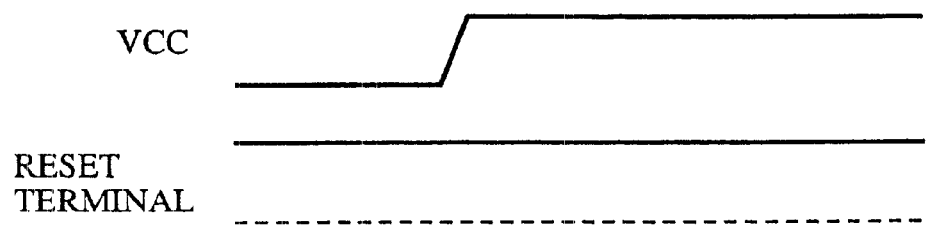
FIG. 7 is a timing chart illustrating a reset operation of the conventional microcomputer when the external reset signal is at the high level at the power-up.
Figure 8:
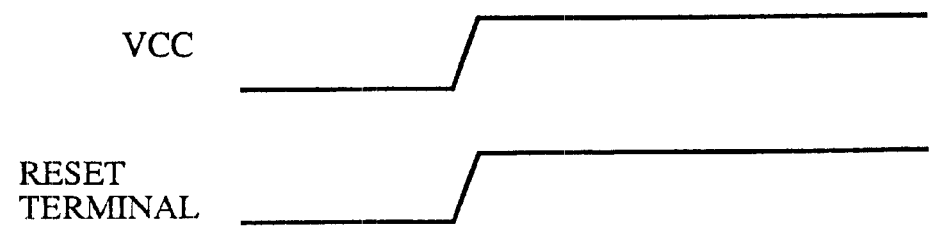
FIG. 8 is a timing chart illustrating a reset operation of the conventional microcomputer when the external reset signal is driven to the high level on the power-up.

FIG. 4 is a timing chart of the foregoing operation, in which FIG. 4(a) illustrates the higher potential power supply voltage level fed to the chip higher potential power supply input terminal 3; FIG. 4(*b*) illustrates the level of the external reset signal; FIG. 4(*c*) illustrates the signal level at the point A in FIG. 2 (second gate input terminal of the first two-input NAND circuit 20); FIG. 4(*d*) illustrates the signal level at the point B in FIG. 2 (first logic signal); and FIG. 4(*e*) illustrates the level of the internal reset signal. As clearly seen from FIG. 4, by driving the external reset signal to the high level after driving it to the low level once, the internal reset signal is driven to the high level.

As described above, according to the present embodiment 1, even when the external reset signal is at the high level at the power-up, the second two-input NAND circuit 23 maintains the level of the internal reset signal at the low level because of the first logic signal which is placed at the low level. As a result, it is possible even when the external reset signal is at the high level at the power-up, to prevent the internal reset signal from being supplied to the internal circuits 10–16. This offers an advantage of being able to positively prevent the internal circuits 10–16 from running away because of their unstable operation.

Furthermore, since the internal reset signal follows the level of the external reset signal once the external reset signal has been driven to the low level, the foregoing operation does not impair the normal reset operation.

What is claimed is:

1. A microcomputer with an internal reset signal generator for generating an internal reset signal from an external reset signal supplied to a chip reset input terminal and for supplying the internal reset signal to internal circuits of the microcomputer through a reset signal line, said internal reset signal generator comprising:

a first two-input logic circuit having its first gate input terminal connected to the chip reset input terminal, for outputting a first logic signal at a low level only when its two gate input terminals are placed at a high level;

an inverter for inverting the first logic signal and supplying its output to a second gate input terminal of the first two-input logic circuit;

a capacitor connected between the second gate input terminal and a higher potential power supply; and a second two-input logic circuit supplied with the first logic signal and the external reset signal, for changing the level of the internal reset signal only when both the inputs are at the high level.

2. The microcomputer with an internal reset signal generator according to claim 1, wherein said internal reset signal generator further comprises an inverter connected to an output of the second two-input logic circuit.

3. The microcomputer with an internal reset signal generator according to claim 2, wherein the first two-input logic circuit and the second two-input logic circuit each consist of a two-input NAND circuit.

4. An internal reset signal generator which generates an internal reset signal from an external reset signal supplied to a chip reset input terminal, said internal reset signal generator comprising:

a first two-input logic circuit having its first gate input terminal connected to the chip reset input terminal, for outputting a first logic signal at a low level only when its two gate input terminals are placed at a high level;

an inverter for inverting the first logic signal and supplying its output to a second gate input terminal of the first two-input logic circuit;

a capacitor connected between the second gate input terminal and a higher potential power supply; and a second two-input logic circuit supplied with the first logic signal and the external reset signal, for changing the level of the internal reset signal only when both the inputs are at the high level.

5. The internal reset signal generator according to claim 4, further comprising an inverter connected to an output of the second two-input logic circuit.

6. The internal reset signal generator according to claim 5, wherein the first two-input logic circuit and the second two-input logic circuit each consist of a two-input NAND circuit.

* * * * *